E. O. SCHARTAU.
Lamp Stove.
No. 96,623. Patented Nov. 9, 1869.
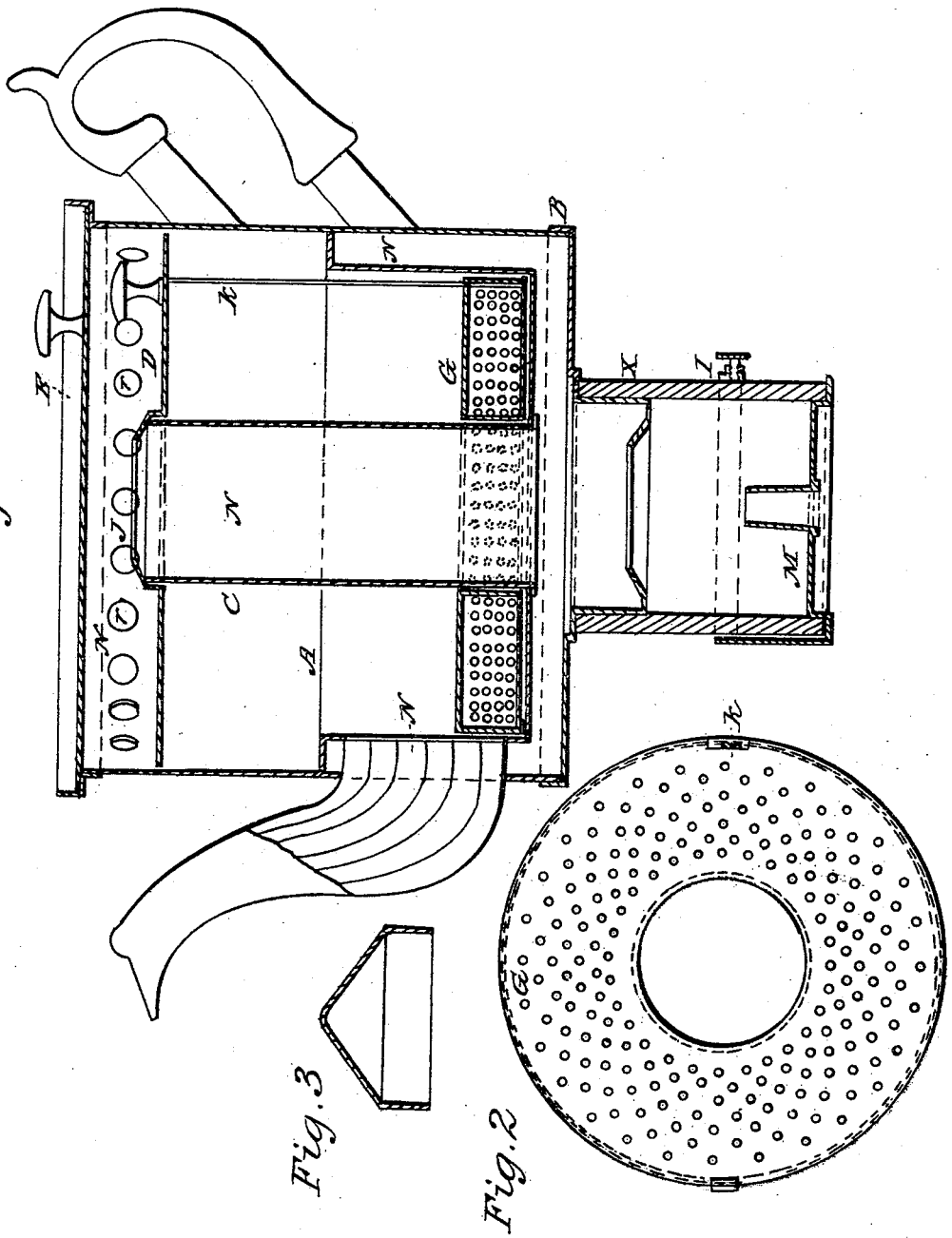
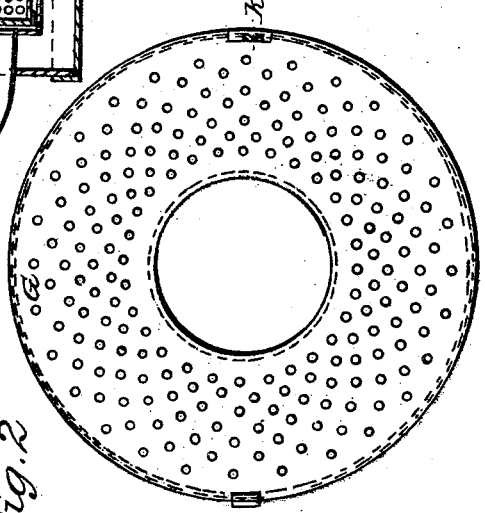

United States Patent Office.

EILERT O. SCHARTAU, OF PHILADELPHIA, PENNSYLVANIA.

Letters Patent No. 96,623, dated November 9, 1869.

GAS HEATER.

The Schedule referred to in these Letters Patent and making part of the same.

*To all whom it may concern:*

Be it known that I, EILERT O. SCHARTAU, of the city of Philadelphia, and State of Pennsylvania, have invented new and useful Improvements in Heaters to be Attached to Lamps or Gas-Burners; and I do hereby declare the following to be an exact description thereof, reference being had to the accompanying drawings, and to the letters of reference marked thereon, making a part of this specification.

It is a tubular kettle, having hot-air chambers, where the heat may condense and act upon an extended surface. In order to further accelerate the boiling, and operate a speedy, and complete reduction of the essential oil and aromatic qualities of the ground coffee, this latter is encased in a hollow ring, which is connected with the lid of the kettle by a wire. This receptacle, by its position, having three sides of it in close contact with heated surfaces, is thus made the focus or centre of the heat produced.

Figure 1 represents the kettle A and the connecting-plate B, which partly forms the lower hot-air chambers, the whole resting upon the lower half of a jointed glass chimney, X.

C is the central pipe, supporting on its top the lid D, this latter having an aperture, J, which is considerably smaller than the pipe, forming thus a chamber for condensed heat in the very centre of the kettle.

With the object of utilizing the heat escaping from the draught-hole J of the lid D, and to create an upper chamber of heat, N, a lid, E, rests upon a flange at the top of the kettle, and a little above the orifice of the lid D.

Below, above, around, and at its centre, the kettle has chambers for condensed heat N N N N.

*r r* are draught-holes.

G, the receptacle for ground coffee, is a perforated hollow ring, with its lid downward, and connected with the lid D by a wire, *k*.

When this heating-apparatus is to be used in connection with a gas-burner, the lower half of the jointed glass chimney X is attached, by a metallic hoop, I, to the supporting plate M.

Figure 2 represents the receptacle G, as seen at fig. 1.

Figure 3 represents a cone-shaped cover for the central pipe C.

What I claim as my invention, and desire to secure by Letters Patent, is—

1. The tubular coffee or tea-pot, with hot-air chambers.

2. The combination of this kettle with the lower half of the jointed glass chimney for lamps and gas-burners, and also of the holder or receptacle for tea or ground coffee, which is attached to the said kettle in the manner and for the purpose herein set forth and specified.

EILERT O. SCHARTAU.

Witnesses:
WILLIAM S. TOLAND,
GEORGE STEINMETZ.